(12) United States Patent
Shiomi et al.

(10) Patent No.: US 8,801,822 B2
(45) Date of Patent: Aug. 12, 2014

(54) EXHAUST GAS TREATMENT SYSTEM FOR ENGINE

(75) Inventors: Hideo Shiomi, Osaka (JP); Taichi Togashi, Osaka (JP)

(73) Assignee: Yanmar Co., Ltd., Osaka-shi, Osaka (JP)

( * ) Notice: Subject to any disclaimer, the term of this patent is extended or adjusted under 35 U.S.C. 154(b) by 0 days.

(21) Appl. No.: 13/583,377

(22) PCT Filed: Feb. 16, 2011

(86) PCT No.: PCT/JP2011/053231
§ 371 (c)(1),
(2), (4) Date: Sep. 7, 2012

(87) PCT Pub. No.: WO2011/111485
PCT Pub. Date: Sep. 15, 2011

(65) Prior Publication Data
US 2012/0325093 A1 Dec. 27, 2012

(30) Foreign Application Priority Data
Mar. 9, 2010 (JP) ................. 2010-052004

(51) Int. Cl.
| | | |
|---|---|---|
| *B01D 39/06* | (2006.01) |
| *B01D 39/14* | (2006.01) |
| *B01D 39/00* | (2006.01) |
| *B01D 24/00* | (2006.01) |
| *B01D 50/00* | (2006.01) |
| *B01D 45/00* | (2006.01) |
| *B01D 46/00* | (2006.01) |
| *B01D 49/00* | (2006.01) |
| *B01D 51/00* | (2006.01) |
| *B01D 53/00* | (2006.01) |
| *B01D 57/00* | (2006.01) |
| *B01D 59/00* | (2006.01) |
| *B01D 39/20* | (2006.01) |
| *F01N 3/023* | (2006.01) |
| *F01N 9/00* | (2006.01) |

(52) U.S. Cl.
CPC ............. *F01N 3/023* (2013.01); *F01N 2560/06* (2013.01); *F01N 2430/00* (2013.01); *F01N 9/002* (2013.01)
USPC ................ 55/425; 55/282.3; 55/522; 55/523; 55/524; 422/177; 422/178; 422/179; 422/180; 422/181; 422/182; 422/169; 422/170; 422/171; 422/172

(58) Field of Classification Search
USPC ......... 55/425, 282.3, 522–524; 422/177–182, 422/169–172
See application file for complete search history.

(56) References Cited

U.S. PATENT DOCUMENTS

| | | | |
|---|---|---|---|
| 7,520,126 B2 * | 4/2009 | Takeshima et al. ............. 60/301 |
| 2005/0144934 A1 * | 7/2005 | Nakatsuji et al. ............... 60/295 |
| 2008/0163610 A1 * | 7/2008 | Baird et al. ...................... 60/295 |
| 2008/0257144 A1 * | 10/2008 | Pinturaud et al. ................. 95/12 |
| 2009/0004073 A1 * | 1/2009 | Gleize et al. ................... 422/180 |

FOREIGN PATENT DOCUMENTS

| | | |
|---|---|---|
| JP | 2004-183506 A | 7/2004 |
| JP | 2009-257323 A | 11/2009 |
| JP | 2010-007562 A | 1/2010 |

OTHER PUBLICATIONS

International Search Report for International Application No. PCT/JP2011/053231, Japanese Patent Office, mailed May 17, 2011, 2 pages.

* cited by examiner

*Primary Examiner* — Amber Orlando
(74) *Attorney, Agent, or Firm* — Sterne, Kessler, Goldstein & Fox P.L.L.C.

(57) ABSTRACT

An exhaust gas aftertreatment system for an engine can perform manual regeneration control for regenerating a particulate removal filter by increasing the engine rotation speed. The system can suppress the engine rotation speed increase while maintaining the exhaust gas temperature required to regenerate the particulate removal filter. The system can set the target engine rotation speed to a first set value when a regeneration instruction signal from a manual regeneration switch is received. When, although the engine rotation speed falls within a predetermined engine rotation speed range including the first set value that is the target engine rotation speed for a predetermined time period, the exhaust gas temperature does not reach the filter's regeneration temperature within the predetermined time period, the target engine rotation speed is repeatedly reset by being increased from the first set value by a predetermined rotation speed.

4 Claims, 3 Drawing Sheets

EXHAUST GAS TREATMENT SYSTEM FOR ENGINE

TECHNICAL FIELD

The present invention relates to an exhaust gas processing system.

BACKGROUND ART

Conventionally, an art is known reducing PM (Particulate matter) included in exhaust gas of a diesel engine with a particulate removing filter referred to as a DPF (Diesel Particulate Filter).

When the temperature of the exhaust gas is higher than the regeneration temperature of the DPF, the PM collected in the DPF can be made harmless and removed. On the other hand, when the temperature of the exhaust gas is lower than the regeneration temperature of the DPF, the PM collected in the DPF cannot be made harmless and removed. Then, in this case, as regeneration control of the DPF, the temperature of the exhaust gas must be made higher than the regeneration temperature regularly by using EGR and exhaust gas with excessive fuel so as to make the PM collected in the DPF harmless and remove it.

The Japanese Patent Laid Open Gazette 2004-183506 discloses construction in which, in the case of manual regeneration control of a DPF for exhaust gas, engine speed is increased to a predetermined value so as to make the temperature of the exhaust gas is higher than the regeneration temperature of the DPF. The manual regeneration control is regeneration control performed based on certain manual operation by an operator.

However, in the construction disclosed by the Japanese Patent Laid Open Gazette 2004-183506, in the case of the manual regeneration control of the DPF, the engine speed is always increased to the predetermined value. Therefore, when the temperature of the exhaust gas is close to the regeneration temperature of the DPF in the operation till then, the engine speed is increased excessively and fuel is consumed uselessly.

DISCLOSURE OF INVENTION

Problems to be Solved by the Invention

The purpose of the present invention is to provide an exhaust gas processing system performing manual regeneration control regenerating a particulate removing filter by increasing engine speed which can suppress increase of engine speed while securing regeneration temperature required for regeneration of a particulate removing filter.

Means for Solving the Problems

In an exhaust gas processing system for an engine according to the present invention, a filter removing particulate in exhaust gas is provided in an exhaust passage, an exhaust gas temperature sensor detecting exhaust gas temperature is provided upstream the filter, a manual regeneration means commanding regeneration of the filter, and a target engine speed is set to be a first set value when a regeneration command signal from the manual regeneration means is received. When the exhaust gas temperature does not reach the regeneration temperature of the filter until a predetermined time passes after the engine speed remains in a predetermined range of engine speed including the first set value which is the target engine speed for a predetermined time, the target engine speed is set to be a value increased for a predetermined engine speed from the first set value, and after this, when the exhaust gas temperature does not reach the regeneration temperature of the filter until the predetermined time passes after the engine speed remains in a predetermined range of engine speed including the reset set value, the target engine speed is set to be a value increased for the predetermined engine speed from the actual engine speed, and repeats this control.

Effect of the Invention

According to the exhaust gas processing system of the present invention, in the manual regeneration control regenerating the particulate removing filter by increasing the engine speed, the increase of the engine speed can be suppressed while securing regeneration temperature required for the regeneration of the particulate removing filter

DETAILED DESCRIPTION OF THE INVENTION

Figure 1:
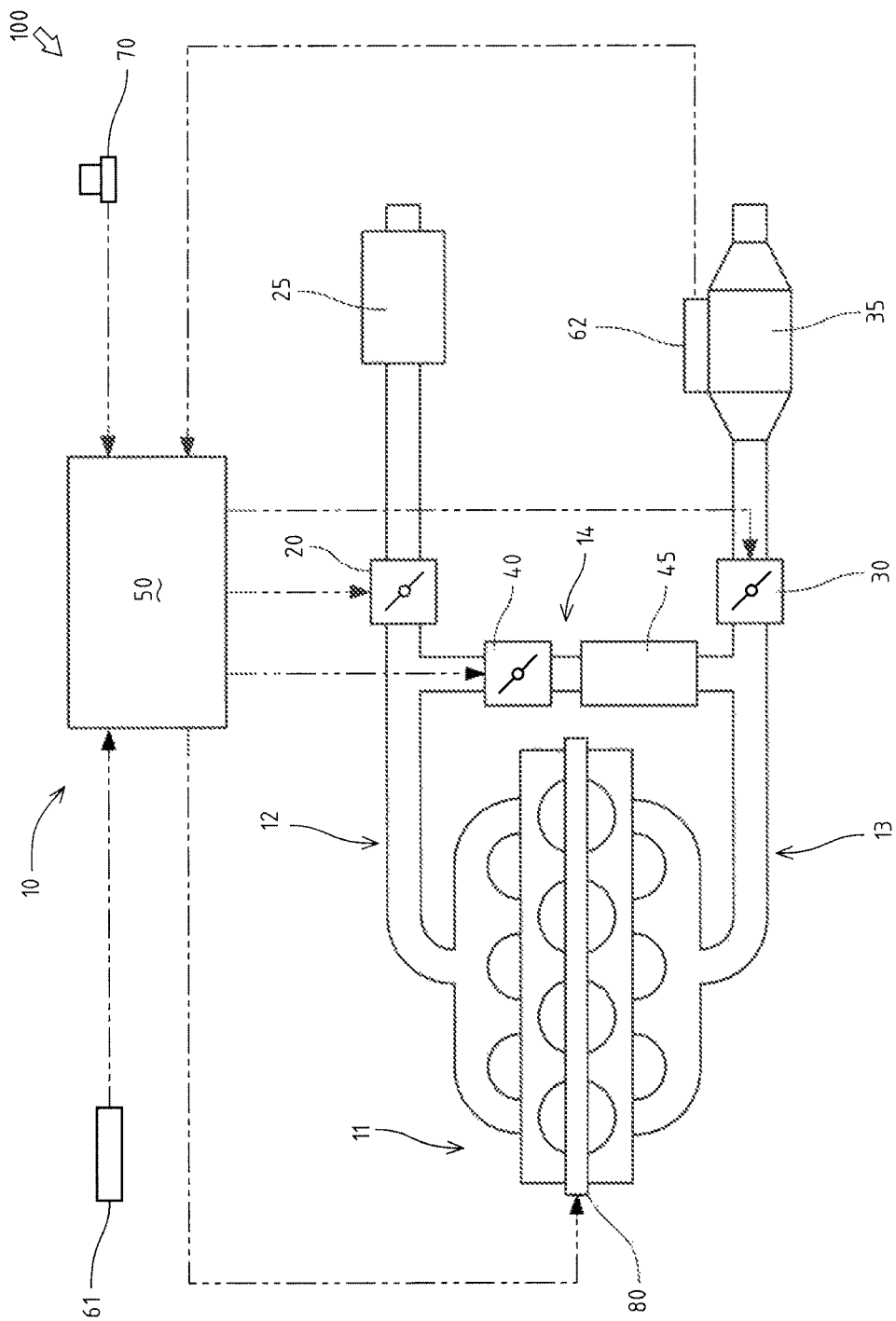
FIG. 1 A schematic drawing of an engine having an exhaust gas processing system which is an embodiment of the present invention.

An explanation will be given on an engine 100 having an exhaust gas processing system 10 which is an embodiment of the present invention referring to FIG. 1.

The engine 100 includes a four-cylindered engine body 11, an intake route 12, an exhaust route 13, an EGR route 14, a regeneration switch 70 as a manual regeneration means, a fuel injection device 80 and an ECU (Engine Control Unit) 50.

The intake route 12 is connected to an intake manifold of the engine body 11, and has an air cleaner 25 and an intake throttle 20. The intake throttle 20 is arranged downstream the air cleaner 25 in the intake route 12.

The exhaust route 13 is connected to an exhaust manifold of the engine body 11, and has an exhaust throttle 30 and a DPF (Diesel Particulate Filter) 35 as a particulate removing filter. The exhaust throttle 30 is arranged upstream the DPF 35 in the exhaust route 13.

The EGR route 14 is connected to the part of the intake route 12 downstream the intake throttle 20 and connected to the part of the exhaust route 13 upstream the exhaust throttle 30, and has an EGR valve 40 and an EGR cooler 45.

The ECU 50 is a control means of the engine 100 and is connected to the intake throttle 20, the exhaust throttle 30, the EGR valve 40, an engine speed sensor 61, an exhaust gas temperature sensor 62, the regeneration switch 70 as the manual regeneration means, and the fuel injection device 80.

The ECU 50 controls fuel injection of the fuel injection device 80 so as to make an engine speed Ne become a target engine speed Nem, thereby controlling the engine speed Ne. The target engine speed Nem is set with a target engine speed setting means, for example an accelerator lever.

For example, in the case in which the engine 100 is mounted on a working vehicle, the regeneration switch 70 is arranged as a manual switch near an operation panel of an operator's seat. Before work with the working vehicle, an operator turns the regeneration switch 70 on so as to regenerate the DPF 35 manually.

The exhaust gas processing system 10 includes the ECU 50, the exhaust gas temperature sensor 62, the regeneration switch 70 and the fuel injection device 80, and performs regeneration control which raises exhaust gas temperature so as to make harmless PM (Particulate matters) collected in the DPF 35 and remove them when the exhaust gas temperature is lower than a regeneration temperature Th1 required for the regeneration of the DPF 35.

The exhaust gas processing system 10 in this embodiment performs manual regeneration control as discussed below. Namely, in the case of receiving a regeneration command signal, when the exhaust gas temperature is lower than the regeneration temperature Th1, the engine speed Ne is increased so as to raise the exhaust gas temperature not less than the regeneration temperature Th1.

Figure 2:
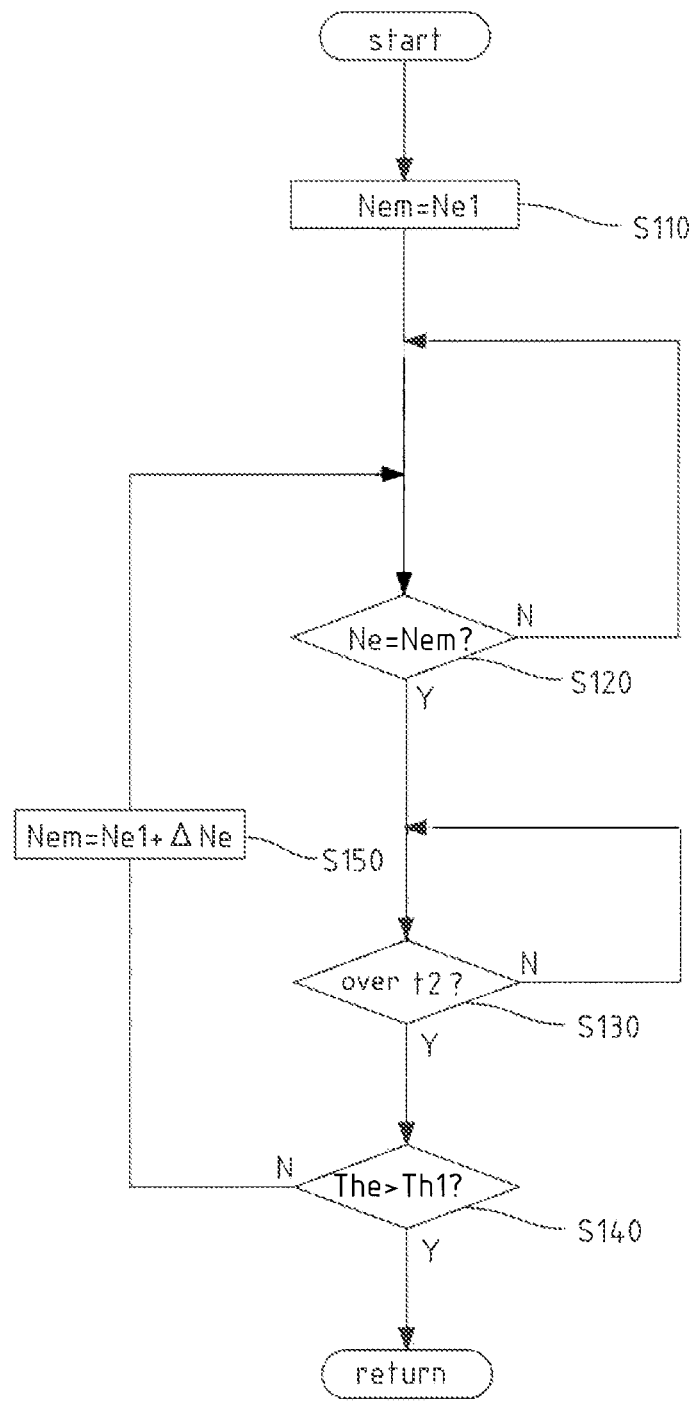
FIG. 2 A flow chart of manual regeneration control.

An explanation will be given on a flow of the manual regeneration control referring to FIG. 2.

When the regeneration switch 70 is turned on and the regeneration command signal is received, the ECU 50 performs below manual regeneration control.

Firstly, at a step S110, the ECU 50 makes the target engine speed Nem be a first set value Ne1 set previously so as to control the engine speed Ne. In this embodiment, the first set value Ne1 is a low idling speed of the engine 100.

Next, at a step S120, the ECU 50 confirms whether the engine speed Ne converges at the target engine speed Nem or not. When the engine speed Ne converges at the target engine speed Nem, the control shifts to a step S130. Convergence at the target engine speed Nem means the state in which the engine speed Ne remains in a predetermined range of engine speed including the target engine speed Nem for a predetermined time.

Then, at the step S130, the ECU 50 confirms whether an exhaust temperature monitoring time t2 passes after the engine speed Ne converges at the target engine speed Nem or not. When the exhaust temperature monitoring time t2 passes, the control shifts to a step S140. The exhaust temperature monitoring time t2 is previously set and stored in the ECU 50, and enough longer than a time for increasing the engine speed Ne for a predetermined engine speed ΔNe (t1 in FIG. 3).

At the step S140, the ECU 50 confirms whether the exhaust gas temperature reaches the regeneration temperature Th1 required for the regeneration of the DPF 35 or not. When the exhaust gas temperature does not reach the regeneration temperature Th1, the control shifts to a step S150. When the exhaust gas temperature reaches the regeneration temperature Th1, the actual target engine speed Nem is maintained. In this case, the PM collected in the DPF 35 is made harmless and removed. The regeneration temperature Th1 is previously stored in the ECU 50, and is the temperature which can make the PM collected in the DPF 35 harmless and remove it.

At the step S150, the ECU 50 changes the target engine speed Nem from the actual value to the value increasing the first set value Ne1 for the predetermined engine speed ΔNe, and the control shifts to the step S120 again. The predetermined engine speed ΔNe is previously set optionally and stored in the ECU 50.

An explanation will be given on an embodiment of the variation of the engine speed Ne by the manual regeneration control referring to FIG. 3.

Figure 3:
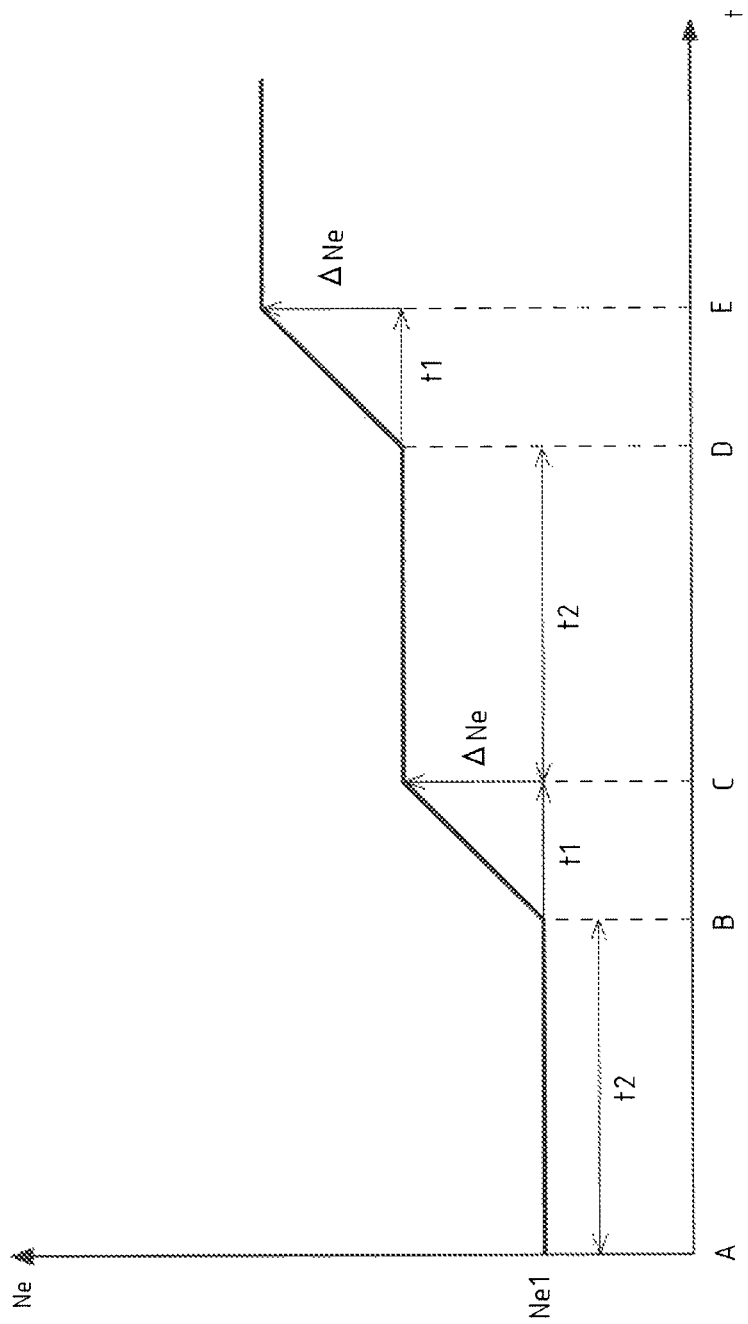
FIG. 3 A flow chart of time series variation of the manual regeneration control.

FIG. 3 shows the time series variation of the engine speed Ne. The behavior of the engine speed Ne is described below following the time series (points A to E passing successively).

At the point A just after starting the manual regeneration control, the target engine speed Nem is set to be the first set value Ne1. The engine speed Ne is controlled to converge at the first set value Ne1.

At the point B, since the exhaust temperature monitoring time t2 passes after the engine speed Ne converges at the first set value Ne1 and the exhaust gas temperature does not reach the regeneration temperature Th1, the target engine speed Nem is set to be the value increased for the predetermined engine speed ΔNe from the first set value Ne1 which is the actual value.

At the point C, the engine speed Ne is controlled to converge at the reset target engine speed Nem(Ne1+ΔNe).

At the point D, since the exhaust temperature monitoring time t2 passes after the engine speed Ne converges at the target engine speed Nem(Ne1+ΔNe) and the exhaust gas temperature does not reach the regeneration temperature Th1 again, the target engine speed Nem is set to be the value increased for the predetermined engine speed ΔNe from the target engine speed Nem(Ne1+ΔNe) which is the actual value.

At the point E, the engine speed Ne is controlled to converge at the target engine speed Nem(Ne1+2ΔNe).

After this, the same control from the point D to the point E is repeated until the exhaust gas temperature reaches the regeneration temperature Th1.

As mentioned above, in the exhaust gas processing system 10, after starting the manual regeneration control, when the exhaust gas temperature does not reach the regeneration temperature Th1 of the DPF 35 until the predetermined time passes after the engine speed Ne converges at the first set value Ne1 which is the target engine speed Nem, the target engine speed Nem is set to be the value increased for the predetermined engine speed from the first set value Ne1. Then, when the exhaust gas temperature does not reach the regeneration temperature Th1 of the DPF 35 until the predetermined time passes after the engine speed Ne converges at the reset target engine speed Nem(Ne1+ΔNe), the target engine speed Nem is set to be the value increased for the predetermined engine speed from the actual engine speed Nem(Ne1+ΔNe) and repeats this control.

In the exhaust gas processing system 10, the exhaust gas temperature is monitored, and when the exhaust gas temperature does not reach the regeneration temperature Th1, the target engine speed Nem is increased for the predetermined engine speed ΔNe for each passing of the exhaust temperature monitoring time t2 by stages, for example the target engine speed Nem(Ne1+ΔNe), the target engine speed Nem(Ne1+2ΔNe), the target engine speed Nem(Ne1+3ΔNe), and the target engine speed Nem(Ne1+4ΔNe), whereby the exhaust gas temperature is raised so as to reach the regeneration temperature Th1.

Therefore, excessive increase of the engine speed Ne can be suppressed while securing the regeneration temperature Th1 required for the regeneration of the DPF 35. As a result, useless consumption of fuel can be reduced.

INDUSTRIAL APPLICABILITY

The present invention can be employed in an exhaust gas processing system performing manual regeneration control regenerating a particulate removing filter by increasing engine speed.

The invention claimed is:
1. An exhaust gas processing system for an engine comprising
   a filter positioned in an exhaust passage configured to remove particulate in exhaust gas;
   an exhaust gas temperature sensor positioned upstream of the filter;

a manual regeneration means configured to initiate regeneration of the filter, a controller configured to:
   set a target engine speed set value when a regeneration command signal from the manual regeneration means is received,
   increase the target engine speed set value by a predetermined engine speed value if the exhaust gas temperature does not reach a regeneration temperature of the filter after a predetermined period of time from when an actual engine speed converges on the target engine speed set value, and
   repeat the increase step by increasing the target engine speed set value by the predetermined engine speed value for the predetermined period of time until the exhaust gas temperature reaches the regeneration temperature.

2. The system of claim 1, wherein the controller is configured to determine when the actual engine speed converges on the target engine speed set value.

3. The system of claim 1, wherein the predetermined period of time is a stored value.

4. The system of claim 1, wherein the regeneration temperature is a stored value.

\* \* \* \* \*